(12) United States Patent
Vitali (10) Patent No.: US 7,624,605 B2
(45) Date of Patent: Dec. 1, 2009

(54) COMBINED BICYCLE PEDAL AND LOCK

(76) Inventor: Minin Vitali, Mosche Ventura st 10/6, Jerusalem 97794 (IL)

( * ) Notice: Subject to any disclaimer, the term of this patent is extended or adjusted under 35 U.S.C. 154(b) by 285 days.

(21) Appl. No.: 11/444,351

(22) Filed: Jun. 1, 2006

(65) Prior Publication Data
US 2007/0277569 A1 Dec. 6, 2007

(51) Int. Cl.
  E05B 71/00 (2006.01)
  B62H 5/00 (2006.01)
  B62M 3/08 (2006.01)
(52) U.S. Cl. ............... 70/233; 70/41; 70/53; 74/594.4; 74/594.7
(58) Field of Classification Search .......... 70/41, 70/49, 53, 233, 236; 74/594.1, 594.4, 594.6, 74/594.7
  See application file for complete search history.

(56) References Cited

U.S. PATENT DOCUMENTS

| | | | | |
|---|---|---|---|---|
| 598,656 | A * | 2/1898 | De Colton | 70/226 |
| 609,127 | A * | 8/1898 | Stearns | 70/236 |
| 3,747,376 | A * | 7/1973 | White, Jr. | 70/233 |
| 5,018,374 | A * | 5/1991 | Montano | 70/233 |
| 5,325,689 | A * | 7/1994 | Warner | 70/233 |
| 5,913,906 | A * | 6/1999 | Strocchi | 70/233 |
| 6,637,292 | B2 * | 10/2003 | Chu | 74/594.7 |
| 6,668,605 | B2 * | 12/2003 | Hengelhaupt et al. | 70/233 |
| 6,820,448 | B1 * | 11/2004 | Hsieh | 70/233 |
| 7,013,754 | B2 * | 3/2006 | Milanowski | 74/594.6 |
| 7,316,302 | B2 * | 1/2008 | Hogesta | 70/233 |

* cited by examiner

*Primary Examiner*—Peter M Cuomo
*Assistant Examiner*—Christopher Boswell
(74) *Attorney, Agent, or Firm*—Mark Friedman (57) ABSTRACT

A combined bicycle pedal and lock and a method for its use, which is an integral part of a bicycle and serves both as an ordinary bicycle pedal and as a means of locking the bicycle to an object which is not a part of the bicycle.

The combined bicycle pedal and lock includes a pedal shaft, several main components, which carry the majority of the load applied to the pedal when riding the bicycle, a complementary locking assembly, which has two modes, a folded mode when the combined bicycle pedal and lock is serving as a pedal, and mode that can be extended when the combined bicycle pedal and lock is serving to lock the bicycle to a suitable object, as well as a short pedal shaft, and a locking mechanism which is operated by means of a key, combination wheel, or any other suitable means.

7 Claims, 11 Drawing Sheets

COMBINED BICYCLE PEDAL AND LOCK

FIELD AND BACKGROUND OF THE INVENTION

The present invention relates to bicycle and motorcycle locks and, in particular to a combined bicycle pedal and lock device which comprises an integral component of a bicycle, enabling regular riding of the bicycle, with the combined bicycle pedal and lock serving both as a pedal and also to enable locking the bicycle to an anchoring means, such as a tree, a metal bar or frame, or a street pole, with the combined bicycle pedal and lock serving as the lock.

Bicycle theft is common and easy to perform. A thief who finds a bicycle which is not locked, especially in open space, can easily take the bicycle, ride it, and disappear from the area in a very short period of time. The thief can also, instead of riding the stolen bicycle, move it on its wheels while walking alongside it and supporting it or load it on a vehicle and leave the area.

In order to prevent bicycle theft, or at least make it difficult, many various types of bicycle locking means have been developed and are in use. These means can be divided into two groups. The first group includes locking means that prevent the ability to ride the bicycle or move it on its wheels, by preventing the possibility for rotational movement of at least one of the wheels around its axle. The second group includes locking means designated to lock the bicycle to an anchoring means, such as a pole, tree, or designated anchor.

Figure 1:
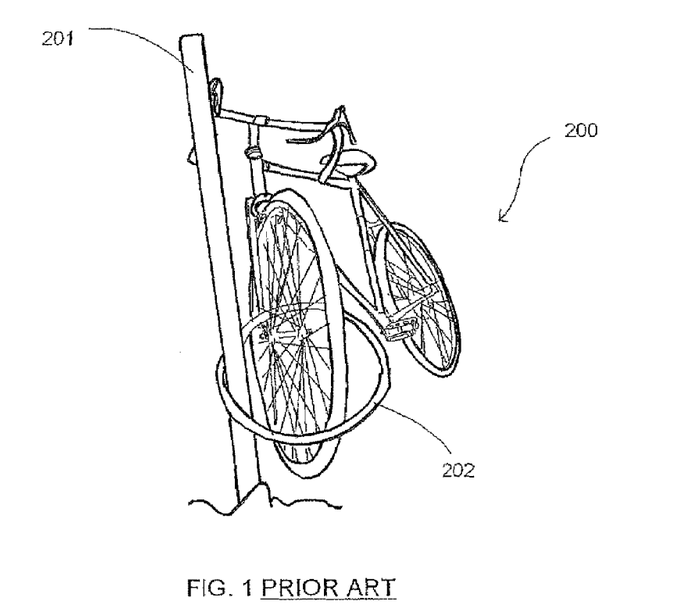
FIG. 1 of the prior art illustrates a bicycle resting on a street pole and locked to it by a locking means to prevent theft.

An example of an anchoring means of the second group is shown in FIG. 1 in which bicycle 200 is locked to pole 201 by locking means 202.

Figure 2A:
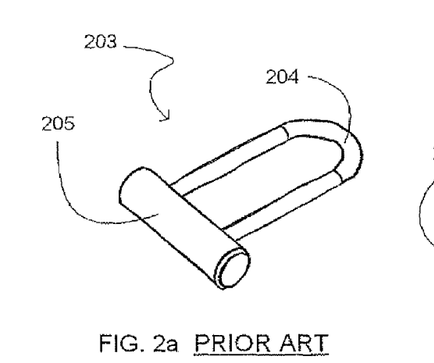
FIG. 2a of the prior art illustrates a U-lock type locking means.
Figure 2B:
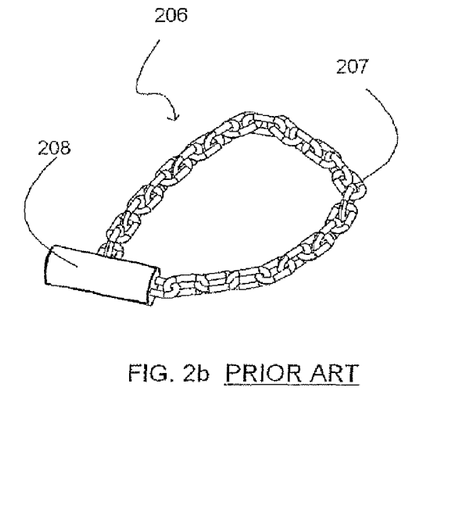
FIG. 2b of the prior art illustrates a chain type locking means.

Many means are included in the second group, one of which is the U-lock 203, shown in FIG. 2a, including a U-shaped bar 204, usually of metal, and lock 205. An additional means from the second group is the locking chain 206, including a chain 207 and lock 208. Similarly, the means can include a cable in lieu of chain 207.

Locking means which are not an integral part of the bicycle need to be carried somehow when they are not locking the bicycle, making riding the bicycle more difficult and inconvenient.

There is thus a widely recognized need for, and it would be highly advantageous to have a bicycle lock, which is an integral part of the bicycle, which enables regular operation of a bicycle when riding it, when moving it on its wheels, and during storage, and also enables simply and efficiently locking the bicycle to an anchoring stand.

SUMMARY OF THE INVENTION

It is an objective of the present invention to provide a means for locking a bicycle to a designated bicycle stand or to any other anchor which is not designated for this purpose but suitable, such as a tree in a park, a streetlight, etc., with the locking means as an integral part of the bicycle which can serve as a standard bicycle part, such as a pedal.

Additional objects and advantages of the invention will be set forth in part in the description which follows and, in part, will be obvious from the description, or may be learned by practice of the invention.

According to the present invention there is provided a combined bicycle pedal and lock assembly for enabling the rider of a bicycle to use the assembly as a pedal while riding the bicycle, and as a locking means for locking the bicycle to an object at another times, wherein the combined bicycle pedal and lock assembly is an integral part of the bicycle, the combined bicycle pedal and lock including: (a) a pedal assembly; and (b) a complementary locking assembly disposed on the pedal assembly.

According to still further features in the described preferred embodiments the combined bicycle pedal and lock assembly, wherein the pedal assembly includes: (i) a pedal shaft, having a symmetrical axis; (ii) a static main component, disposed on the pedal shaft, wherein the static main component operatively has free rotational motion around the pedal shaft symmetrical axis; and (iii) a dynamic main component, disposed on the static main component, wherein the dynamic main component can be disconnected from the static main component.

According to still further features in the described preferred embodiments the combined bicycle pedal and lock assembly, wherein the complementary locking assembly having a first end disposed on the static main component, and a second end, disposed on the dynamic main component.

According to still further features in the described preferred embodiments the combined bicycle pedal and lock assembly further including: (iv) at least one additional dynamic main component, disposed on the pedal shaft, wherein the least one additional dynamic main component is disposed on the static main component, wherein the dynamic main component can be disconnected from the static main component.

According to still further features in the described preferred embodiments the combined bicycle pedal and lock assembly, wherein the pedal shaft, has a length dimension along the symmetrical axis, wherein the length dimension is at most 35 millimeters.

According to still further features in the described preferred embodiments the combined bicycle pedal and lock assembly, wherein the complementary locking assembly includes: (i) a cable having a first end disposed on the static main component, and a second end, disposed on the dynamic main component.

According to still further features in the described preferred embodiments the combined bicycle pedal and lock assembly further including: (c) a locking mechanism disposed on the static main component.

According to still further features in the described preferred embodiments the combined bicycle pedal and lock assembly, wherein the complementary locking assembly includes: (i) a cable having a first end disposed on the static main component, and a second end, disposed on the dynamic main component, wherein at least part of the cable length is springy, and wherein at least part of the cable length can be wrapped around the locking mechanism.

According to still further features in the described preferred embodiments the combined bicycle pedal and lock assembly, wherein the pedal assembly includes: (i) a pedal shaft, having a symmetrical axis and a length dimension along the symmetrical axis, wherein the length dimension is at most 35 millimeters; (ii) a static main component, having a first end and a second end, wherein the first end of the static main component is disposed on the pedal shaft, and wherein the static main component operatively has free rotational motion around the pedal shaft symmetrical axis; (iii) a dynamic main component, having a first end and a second end, wherein the first end of the dynamic main component is disposed on first end of the static main component, and wherein the dynamic main component can be disconnected from the static main component.

According to still further features in the described preferred embodiments the combined bicycle pedal and lock assembly, having at least two modes of operation, a first mode of operation suitable for use as a bicycle pedal, and a second mode of operation suitable for locking around an object, wherein the dynamic main component includes: (A) a pedal shaft head cover, wherein the pedal shaft head cover serves to protect the area of the pedal shaft head when the combined bicycle pedal and lock assembly is in the second mode of operation suitable for locking around an object.

According to still further features in the described preferred embodiments the combined bicycle pedal and lock assembly, wherein the combined bicycle pedal and lock assembly formations define an opening that enables locking the bicycle to a ring made of a bar the diameter of whose cross-section is at least one centimeter.

According to still further features in the described preferred embodiments the combined bicycle pedal and lock assembly further including: (c) a locking mechanism disposed on the first end of the static main component, and wherein the complementary locking assembly includes; (i) two pivots, wherein one of the pivots is disposed on the second end of the static main component, and another one of the pivots is disposed on the second end of the dynamic main component; and (ii) a link, having a first end and a second end, wherein the first end of the link is disposed on the second one pivot, and wherein the second end of the link is disposed on the another one pivot, wherein the link operatively has free rotational motion around each of the pivots when the dynamic main component is disconnected from the static main component.

According to still further features in the described preferred embodiments the combined bicycle pedal and lock assembly of claim 10 further including: (c) a locking mechanism disposed on the first end of the dynamic main component, and wherein the complementary locking assembly includes; (i) two pivots, wherein one of the pivots is disposed on the second end of the static main component, and another one of the pivots is disposed on the second end of the dynamic main component; and (ii) a link, having a first end and a second end, wherein the first end of the link is disposed on the second one pivot, and wherein the second end of the link is disposed on the another one pivot, wherein the link operatively has free rotational motion around each of the pivots when the dynamic main component is disconnected from the static main component.

According to still further features in the described preferred embodiments the combined bicycle pedal and lock assembly of claim 10 further including: (c) a locking mechanism disposed on the first end of static main component, wherein the complementary locking assembly includes; (i) at least n+1 pivots; and (ii) at least n links, wherein each of the links is disposed on another of the links by one of the pivots, forming a chain having a first end and a second end, wherein the first end of the chain is disposed on the static main component, and wherein the second end of the chain is disposed on the dynamic main component, wherein each of the links operatively has free rotational motion around two of the pivots when the dynamic main component is disconnected from the static main component; wherein n is a positive integer number larger than one.

According to still further features in the described preferred embodiments the combined bicycle pedal and lock assembly, wherein the locking mechanism includes; (i) a locking mechanism shaft; (ii) at least one latch disposed on the locking mechanism shaft, wherein the latch can protrude from the locking mechanism shaft; and (iii) at least two shackles disposed on the dynamic main component.

According to still further features in the described preferred embodiments the combined bicycle pedal and lock assembly of claim 16 further including: (d) at least one strengthening element disposed on the pedal shaft; and (e) a bearing, wherein the bearing enables the pedal assembly operatively low-friction free rotational motion around the pedal shaft.

According to still further features in the described preferred embodiments the combined bicycle pedal and lock assembly, wherein the maximum deflection of the combined bicycle pedal and lock assembly is at most 0.1 millimeter when a bicycle rider applies a force of 600 Newton on the combined bicycle pedal and lock assembly.

According to still further features in the described preferred embodiments the combined bicycle pedal and lock assembly, having at least two main modes of operation configuration, a first mode of operation configuration suitable for use as a bicycle pedal, and a second mode of operation configuration suitable for locking around an object, wherein the first mode of operation configuration suitable for use as a bicycle pedal has external dimensions, wherein the external length dimension along the pedal shafts symmetrical axis is at most 120 millimeters, and wherein any external length dimension perpendicular to the pedal shafts symmetrical axis is at most 80 millimeters, and wherein the second mode of operation configuration suitable for locking around an object has internal dimensions wherein the internal dimensions are suitable for locking the combined bicycle pedal and lock assembly around a post having a round cross section, wherein the post cross section diameter is at least 130 millimeters.

According to another embodiment of the invention the combined bicycle pedal and lock assembly for enabling the rider of a bicycle to use the assembly as a pedal while riding the bicycle, and as a locking means for locking the bicycle to an object at other times, wherein the combined bicycle pedal and lock assembly is an integral part of the bicycle, the combined bicycle pedal and lock including: (a) a pedal shaft, having a symmetrical axis, and a length dimension along the symmetrical axis, wherein the length dimension is at most 35 millimeters; (b) a static main component, having a first end and a second end, wherein the first end of the static main component is disposed on the pedal shaft, and wherein the static main component operatively has free rotational motion around the pedal shaft symmetrical axis; (c) a dynamic main component, having a first end and a second end, wherein the second end of the dynamic main component is disposed on the second end of the static main component, wherein the first end of the dynamic main component can be connected to the static main component; and (d) a locking mechanism disposed on the static main component; wherein the combined bicycle pedal and lock assembly formations define an opening that enables locking of the bicycle to a ring, made of a bar the diameter of whose cross-section is at least one centimeter.

According to another embodiment of the invention the combined bicycle pedal and lock assembly for enabling the rider of a bicycle to use the assembly as a pedal while riding the bicycle, and as a locking means for locking the bicycle to an object at other times, wherein the combined bicycle pedal and lock assembly is an integral part of the bicycle, the combined bicycle pedal and lock including: (a) a pedal shaft, having a symmetrical axis; (b) a locking mechanism, having a symmetrical axis, disposed on the pedal shaft, wherein the locking mechanism operatively has free rotational motion around the pedal shaft symmetrical axis; (c) a static main component, disposed on the locking mechanism, wherein the static main component operatively has free rotational motion around the pedal shaft symmetrical axis; and (iii) a dynamic main component, disposed on the locking mechanism, wherein the dynamic main component operatively has a limited rotational motion around the locking mechanism symmetrical axis According to the present invention there is provided a method of locking a bicycle, including the steps of: (a) providing a bicycle including: (i) a combined bicycle pedal and lock assembly including: (A) a pedal assembly; (B) a complementary locking assembly disposed on the pedal assembly; and (C) locking mechanism; (b) unlocking the locking mechanism (c) extending the locking; completion assembly (d) binding the complementary locking assembly around a pole; and (e) locking the locking mechanism.

The most significant improvement of the present invention with regard to the prior art is the combination of the following qualities: the locking means, thanks to being an integral part of the bicycle and its unique structure, is always available, does not need to be carried or stored separately from the bicycle, enables locking the bicycle to any object of suitable dimensions, while the locking means can be suited to the necessary dimension as determined by the user, enables leaving the bicycle standing stable when locked, and should the means be picked open, renders riding the bicycle impossible or difficult to the extent that it would be difficult for the thief to make a timely escape. Furthermore, the locking means has a new and unique design, which is a breakthrough in the field of lock design and a trendy gadget for bicycle riders.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a bicycle lock and, in particular a combined bicycle pedal and lock device.

The principles and operation of a combined bicycle pedal and lock according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The following list is a legend of the numbering of the application illustrations:
1 pedal shaft
2 central main components
3 static main components
4 dynamic main components
4a lock shackle
4b a hole in the lock shackle
5 locking mechanism
5a latch
5b locking mechanism shaft
6 complementary locking assembly 7 connector
8 cable
9 link
10 pivot
11 pedal shaft screw
12 pedal shaft head
13 pedal shaft head cover
14 bearing external housing
15 strengthening element
20 bicycle crank arm
50 pole
60 rider's foot
101 combined bicycle pedal and lock (also including three main parts and a complementary locking assembly)
102 combined bicycle pedal and lock (also including two main parts and a complementary locking assembly)
103 combined bicycle pedal and lock (also including two main parts and a cable serving as a complementary locking assembly)
104 combined bicycle pedal and lock (also including two main parts and two links serving as a complementary locking assembly)
105 combined bicycle pedal and lock (also including two main parts and four links serving as a complementary locking assembly)
106 combined bicycle pedal and lock (also including two main parts and a cable serving as a complementary locking assembly)
107 combined bicycle pedal and lock (also including two main parts)
201 pole
202 locking means
203 U-lock
204 U-shaped metal bar
206 locking chain
207 chain
208 lock Combined bicycle pedal and lock, according to the present invention, is an integral part of a bicycle, and has two working modes: pedal mode and lock mode, as well as intermediary modes. In pedal mode, the combined bicycle pedal and lock serves as a completely ordinary bicycle pedal, while in lock mode it serves as a system for locking the bicycle to any suitable object.

Combined bicycle pedal and lock according to the present invention also includes the following components and component assemblies:

A pedal shaft, to which the main components, which carry the majority of the load on the pedal when a person is riding the bicycle, are connected. Some of these are referred to as dynamic main components which are locked both in pedal mode and in lock mode thanks to locking mechanism, however when the locking mechanism allows it, they can be unlocked on at least one side and thus can go from one mode to the other, for example unlocking from pedal mode to enable full opening of the combined bicycle pedal and lock, closing around an object, and relocking in lock mode.

Other main components are referred to as static main components, which generally have only rotational freedom around the axle of pedal shaft, however cannot be separated from the components and assemblies of the combined bicycle pedal and lock to which they are connected.

Locking the bicycle to object is done when the interconnected main components encircle the object to which the bicycle is being locked with the locking mechanism preventing them from unlocking. In order to lock the bicycle to an object which is too large to fit in between the pedal parts, a component or assembly of components is connected between the main components, directly or by means of connectors. This component or assembly of components serves as a complementary locking system, which can enable locking the bicycle to objects with cross sections significantly larger than the pedal's dimensions.

Various configurations of the combined bicycle pedal and lock according to the present invention can have various combinations of components and assemblies of the sorts described above.

Figure 3:
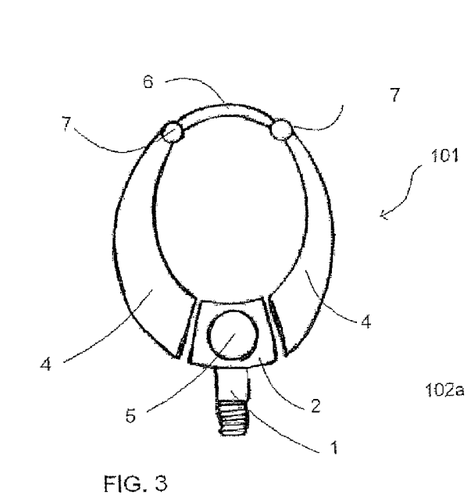
FIG. 3 is a schematic illustration of a preferred embodiment of a combined bicycle pedal and lock also including three main parts and a complementary locking assembly, according to the present invention.

Referring now to the drawings, FIG. 3 is a schematic illustration of a preferred embodiment of a combined bicycle pedal and lock 101, which also includes a central main component 2, attached to a pedal shaft 1 and to a locking mechanism 5, and two dynamic main components 4 connected each to one of either sides of the central main component 2, and interconnected with a complementary locking assembly 6, by means of a connector 7.

Each of the connected dynamic main components 4 can be separated from the central main component 2 and then reconnected. One way of locking the bicycle to an object is when only one of the dynamic main components 4 is first separated and then reconnected after encircling an object such as a pole. Another way of locking the bicycle to an object is when both dynamic main components 4 are separated from the central main component 2 and then reconnected, enable locking to an object which complementary locking assembly 6 cannot encircle. An example of such an object can be a picket fence whose pickets are very close to one another.

Figure 4A:
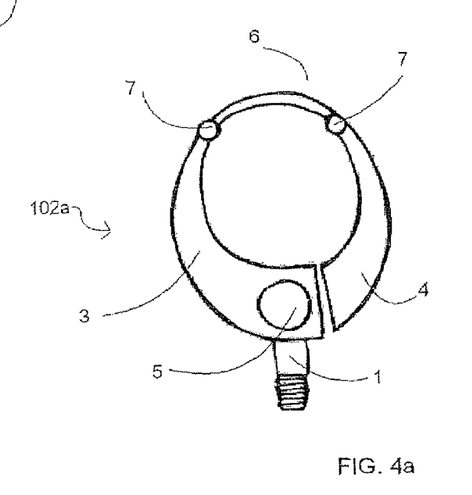
FIG. 4a is a schematic illustration of a preferred embodiment of a combined bicycle pedal and lock also including two main parts and a complementary locking assembly, according to the present invention.

FIG. 4a is a schematic illustration of a preferred embodiment of a combined bicycle pedal and lock 102a, according to the present invention, which also includes the same components and assemblies as those of combined bicycle pedal and lock 101, however without central main components, so that the static main component 3 connects directly to the locking mechanism 5 and to the pedal shaft 1.

Figure 4B:
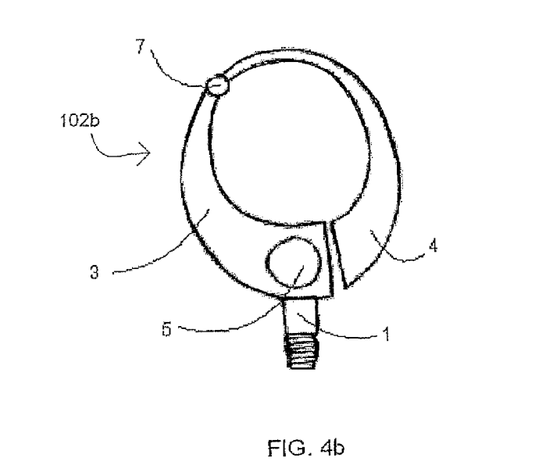
FIG. 4b is a schematic illustration of a preferred embodiment of a combined bicycle pedal and lock also including two main parts, according to the present invention.

FIG. 4b is a schematic illustration of a preferred embodiment of a combined bicycle pedal and lock 102b, according to the present invention, which also includes the same components and assemblies as those of combined bicycle pedal and lock 102a, however without a complementary locking assembly 6, and only one connector 7.

Figure 5:
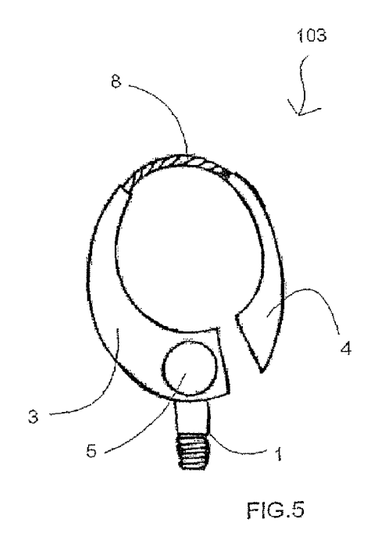
FIG. 5 is a schematic illustration of a preferred embodiment of a combined bicycle pedal and lock also including two main parts and a cable serving as a complementary locking assembly, according to the present invention.

FIG. 5 is a schematic illustration of a preferred embodiment of a combined bicycle pedal and lock 103, according to the present invention, which also includes the same components and assemblies as those of combined bicycle pedal and lock 102a, with the complementary locking assembly composed of one cable 8, or more, connected by direct fastening or any other suitable method on one end to the static main component 3, and on the other end to the dynamic main components 4, and without any connector 7. All of the components, other than cable 8, compose the pedal and serve as a completely ordinary bicycle pedal.

Figure 6:
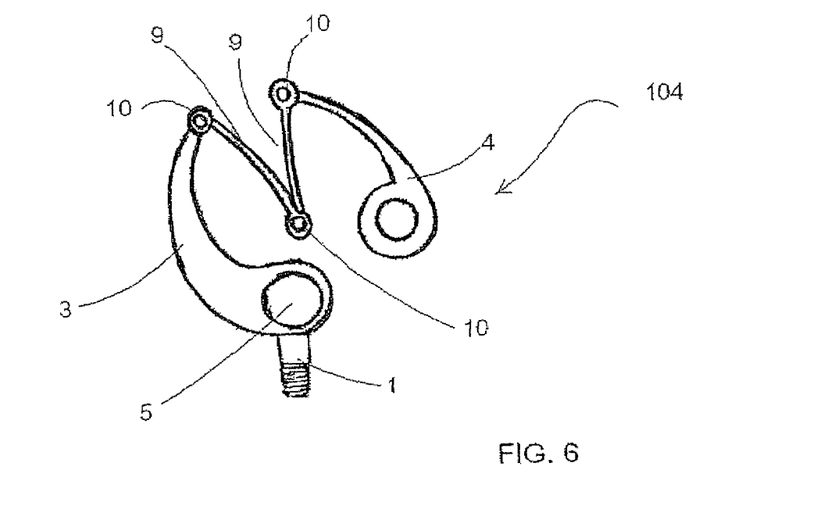
FIG. 6 is a schematic illustration of a preferred embodiment of a combined bicycle pedal and lock also including two main parts and two links serving as a complementary locking assembly, in partially open mode, according to the present invention.

FIG. 6 is a schematic illustration of a preferred embodiment of a combined bicycle pedal and lock 104, which also includes two main parts and two links 9, serving as the complementary locking assembly, according to the present invention, in partially open mode. Both links 9 are interconnected, and in addition, one of them is connected to the static main component 3, and the other is connected to the dynamic main component 4, by means of axles 10.

Figure 7:
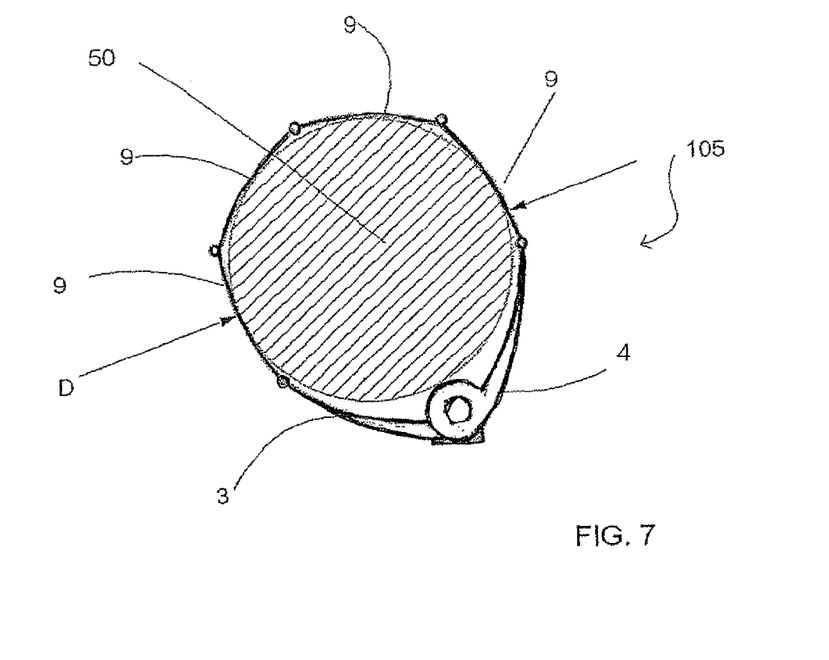
FIG. 7 is a schematic illustration of a preferred embodiment of a combined bicycle pedal and lock, also including two main parts and four links serving as a complementary locking assembly, according to the present invention, locked to a pole.

FIG. 7 is a schematic illustration of a preferred embodiment of a combined bicycle pedal and lock 105, which also includes two main parts, the static main component 3 and the dynamic main component 4, as well as four links 9, serving as the complementary locking assembly, according to the present invention, in locked mode around a pole 50, of a circular cross section and circumference D.

Figure 8A:
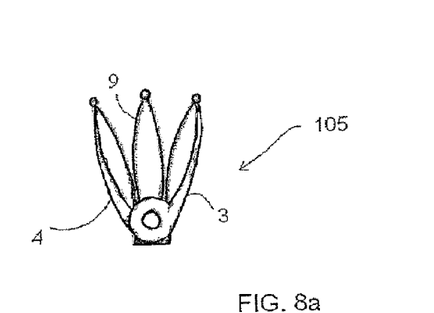
FIGS. 8a-8d are schematic illustrations of a preferred embodiment of a combined bicycle pedal and lock also including two main parts and four links serving as a complementary locking assembly, in various modes, from closed to fully open, according to the present invention.
Figure 8B:
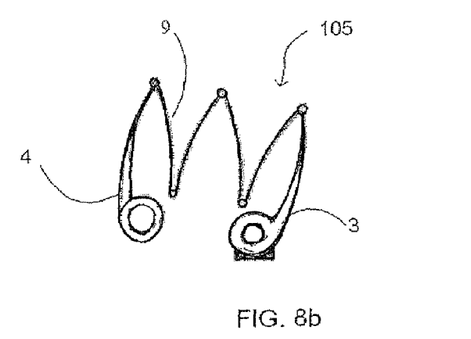
Figure 8C:
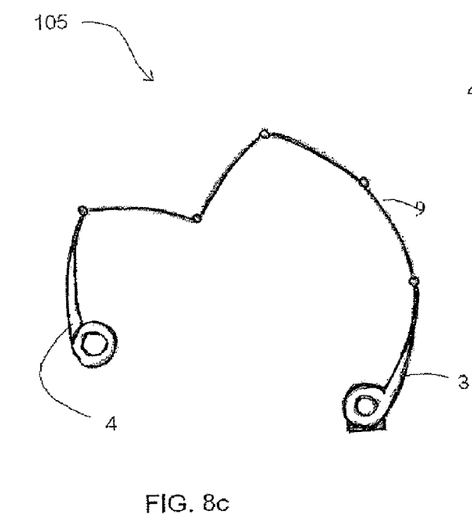
Figure 8D:
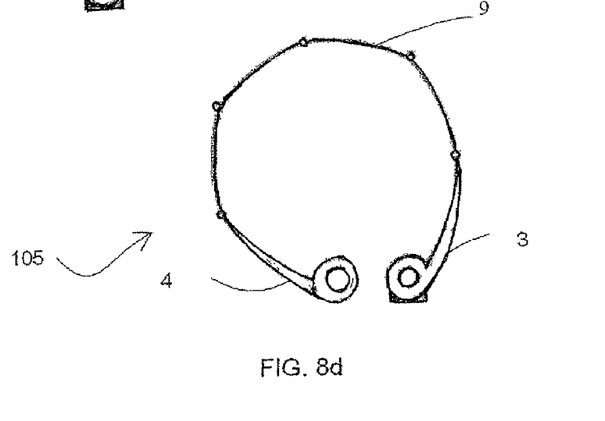

FIGS. 8a-8d are schematic illustrations of a preferred embodiment of a combined bicycle pedal and lock 105 which also includes two main parts, the static main component 3 and the dynamic main component 4, as well as four links 9, serving as the complementary locking assembly, according to the present invention, in various modes, from closed mode suitable for use as a pedal shown in FIG. 8a, through initial opening mode shown in FIG. 8b, and fully open mode suitable for encircling a pole or other suitable object to which the bicycle is to be locked shown in FIG. 8c, to nearly closed mode prior to locking shown in FIG. 8d.

Figure 9:
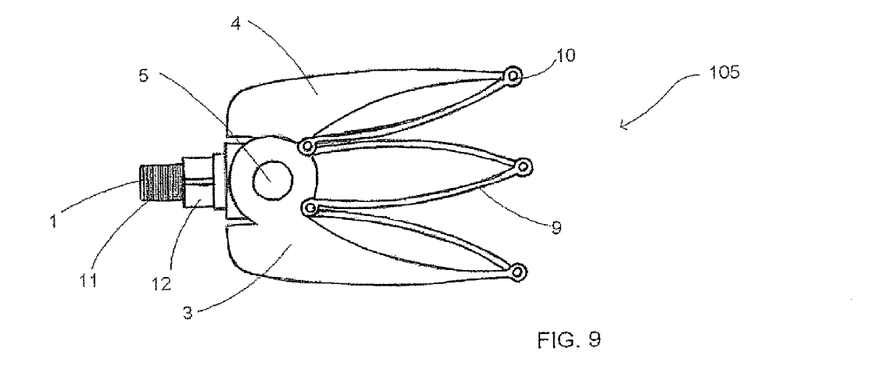
FIG. 9 is a schematic illustration of a preferred embodiment of a combined bicycle pedal and lock also including two main parts and four links serving as a complementary locking assembly, and a pedal shaft in closed mode suitable for use as a bicycle pedal, according to the present invention.

FIG. 9 is a schematic illustration of a preferred embodiment of a combined bicycle pedal and lock 105, which also includes two main parts, the static main component 3 and the dynamic main component 4, as well as four links 9 and five axles 10, serving as the complementary locking assembly, and pedal shaft 1 in closed mode suitable to serve as a bicycle pedal, according to the present invention. The illustration shows part of the structure of the pedal shaft 1, pedal shaft screw 11, and pedal shaft head 12, designated to serve as a grasping point for mechanical tools for strengthening the connection of the combined bicycle pedal and lock 105 to the bicycle crank arm (not shown in this illustration) by means of the pedal shaft 1. Furthermore, bicycle pedal and lock 105 includes a locking mechanism 5, which can be assembled to the static main component 3 as well as to the dynamic main component 4.

Figures 10A, 10B:
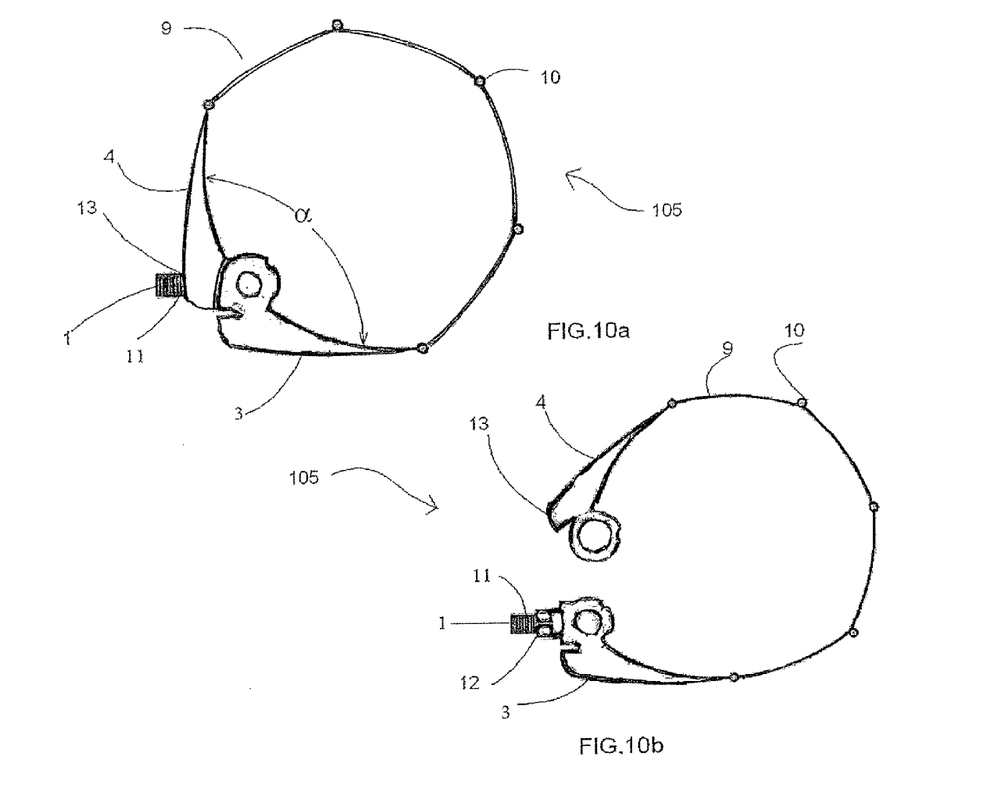
FIGS. 10a and 10b are schematic illustrations of a preferred embodiment of a combined bicycle pedal and lock also including two main parts and four links serving as a complementary locking assembly, in initial open mode and closed mode suitable for locking around an object, according to the present invention.

FIGS. 10a and 10b are schematic illustrations of a preferred embodiment of a combined bicycle pedal and lock 105, which also includes two main parts, the static main component 3 and the dynamic main component 4, as well as four links 9 and five axles 10, serving as the complementary locking assembly, and pedal shaft 1, in closed mode suitable for locking around an object as shown in FIG. 10a, and in slightly open mode as shown in FIG. 10b, according to the present invention.

As shown in these illustrations, and as will be shown in further detail in the following illustrations, some of the dynamic main component 4, serves as the pedal shaft head cover 13, serving to protect the area of the pedal shaft head 12, with the combined bicycle pedal and lock 105 in locked mode as shown in FIG. 10a preventing the possibility of opening the pedal shaft's screw 11. In this mode the angle between the static main component 3, and the dynamic main component 4, is in size α.

When the combined bicycle pedal and lock 105 is in open mode as shown in FIG. 10b, it is possible to disconnect the combined bicycle pedal and lock 105 from the bicycle.

Figure 11:
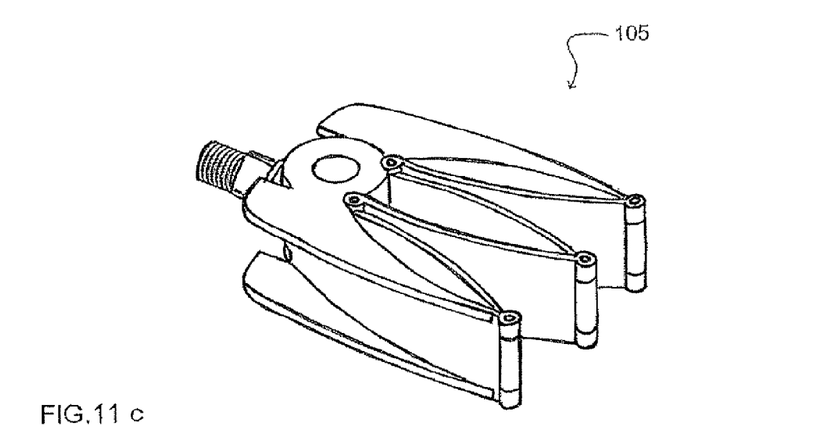
FIGS. 11a-11c are isometric illustrations of a preferred embodiment of a combined bicycle pedal and lock, also including two main parts and four links serving as a complementary locking assembly, from various views, according to the present invention.
Figures 11A, 11B:
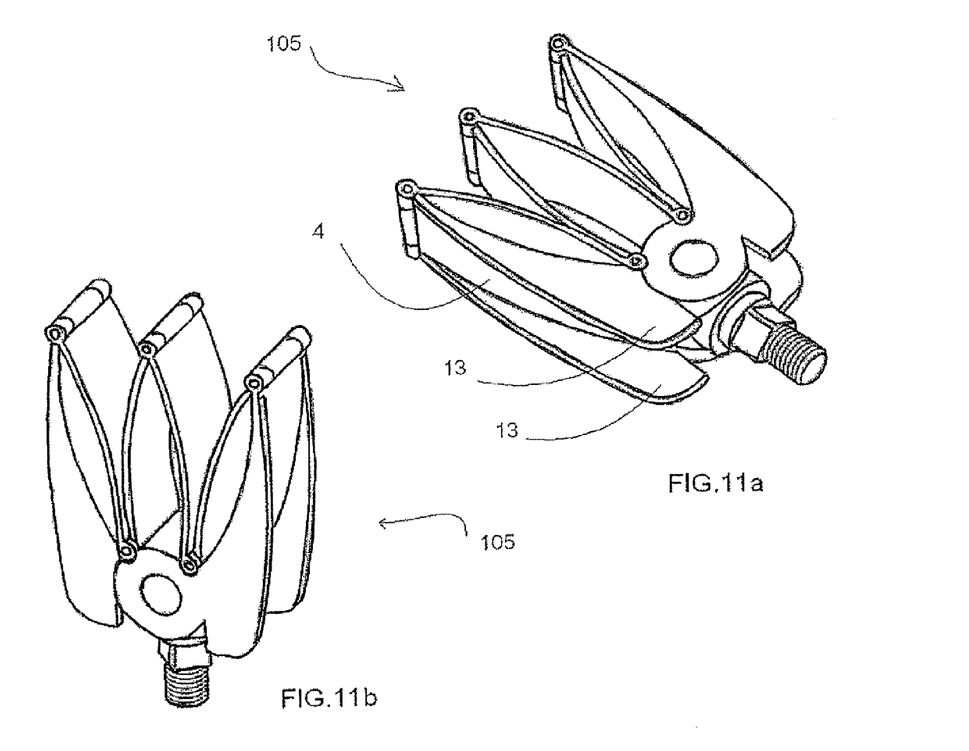

FIGS. 11a-11c are isometric illustrations of various views of a preferred embodiment of a combined bicycle pedal and lock 105, according to the present invention. The illustration shows that the pedal shaft head cover 13, is composed of two surfaces as an integral part of the dynamic main component 4.

Figure 12A:
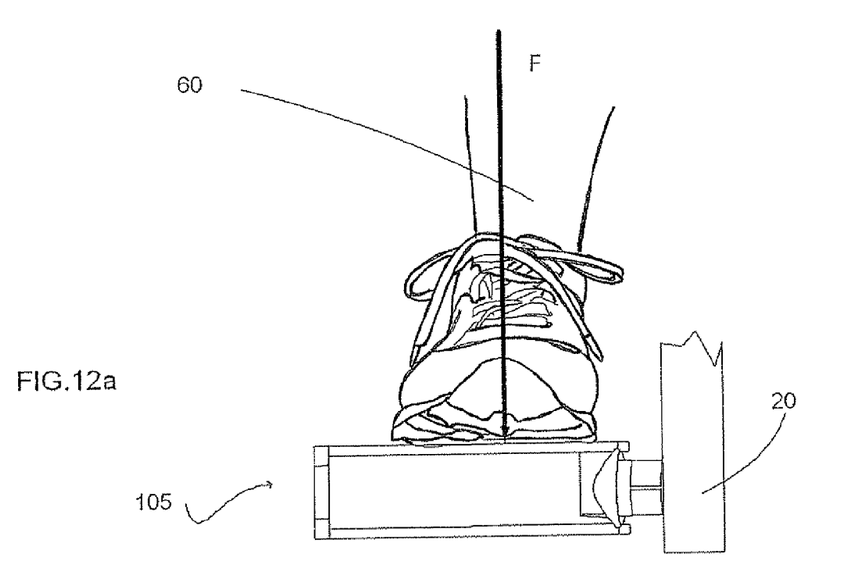
FIGS. 12a-12c are illustrations showing a bending mechanism of a preferred embodiment of a combined bicycle pedal and lock according to the present invention.
Figure 12B:
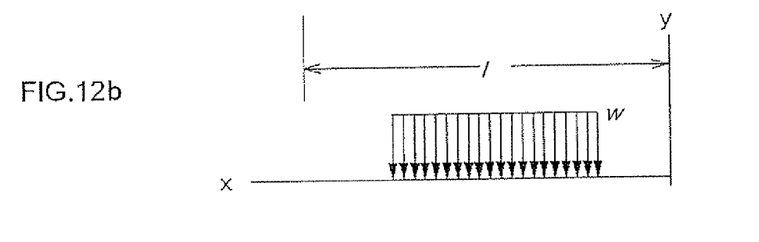
Figure 12C:
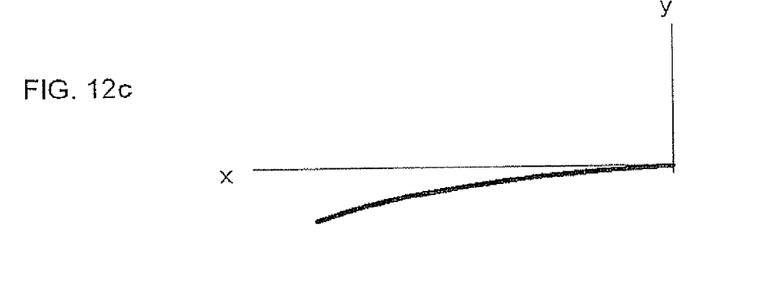

FIGS. 12a-12c are illustrations showing the bending mechanism of a preferred embodiment of a combined bicycle pedal and lock 105, the combined bicycle pedal and lock has an elastic nature, wherein elasticity is that property of a material which enables to regain its original shape and dimensions when the load on it is removed. When the bicycle rider's foot 60 applies force F on the combined bicycle pedal and lock 105 when riding the bicycle, as shown in FIG. 12a, similarly to the force applied to a conventional bicycle pedal, force F is distributed as load w on the combined bicycle pedal and lock. In a more simplified explanation, the load can be described as force per length unit, along x axis, as shown in FIG. 12b. This load causes the combined bicycle pedal and lock to bend at the point at which it is fixedly coupled to bicycle crank arm 20, and along x axis up to distance l which is the length measurement of the combined bicycle pedal and lock. This bending, shown in FIG. 12c, causes deflection $\Delta_y(x)$, with the maximum deflection, $\Delta_{max}$ at the end of the combined bicycle pedal and lock, namely at the point in which y=l.

The maximum deflection, $\Delta_{max}$ depends on the shape of the cross sections of the combined bicycle pedal and lock, shown as I, the area moment of inertia, which is a geometrical quality, which depends on the shape and dimensions of the section perpendicular to x axis, whose value changes if the section of the combined bicycle pedal and lock is not fixed and, and whose material is expressed in E, the modulus of elasticity, which is a quality that depends on the material, and does not change if there is no change in the material along x axis.

A further contribution to deflection is the result of movement freedom, if such exist, in the relevant directions, between the parts of the combined bicycle pedal and lock, particularly the pedal axle and the main parts. Proper design of the combined bicycle pedal and lock, according to the present invention, and if necessary inclusion of a strengthening arm, ensures that for any reasonable force applied to it, the maximum deflection, $\Delta_{max}$ is not too large and does not cause any disruption in the operation of the bicycle, however is not so small as to, require use of special materials or unusually large measurements, namely similar to conventional bicycle pedals.

FIGS. 13a-13d are schematic illustrations of components of a locking mechanism of a preferred embodiment of a combined bicycle pedal and lock according to the present invention.

Figure 13A:
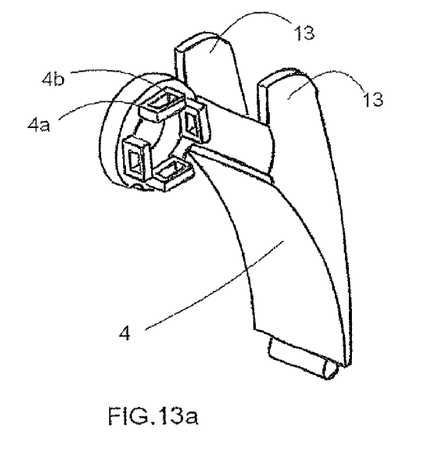
FIGS. 13a-13d are schematic illustrations of components of a locking mechanism of a preferred embodiment of a combined bicycle pedal and lock according to the present invention.

FIG. 13a shows an isometric view of the inner part of the dynamic main component 4, including four lock shackles 4a, while each lock shackle 4a has a hole 4b. The four lock shackles 4a are disposed such that the holes 4b are on one plane, the rotation plane of latches 6, shown in FIGS. 13b-13d. The four lock shackles 4a are arranged in two pairs, while in each pair both lock shackles 4a are disposed at 180 degrees with regard to one another, with each pair disposed at 90 degrees to the other, or at any other angle α suitable for locked mode as shown in FIG. 10a.

Figure 13B:
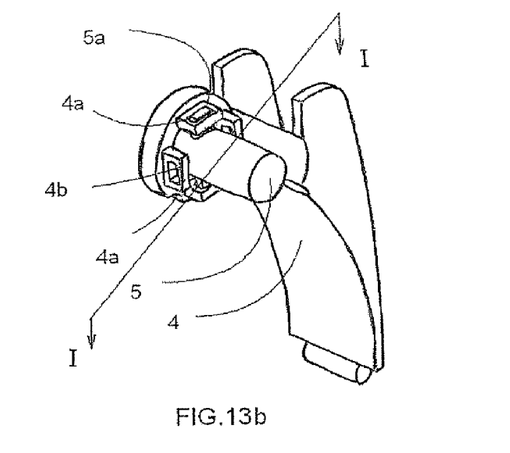
Figures 13C, 13D:
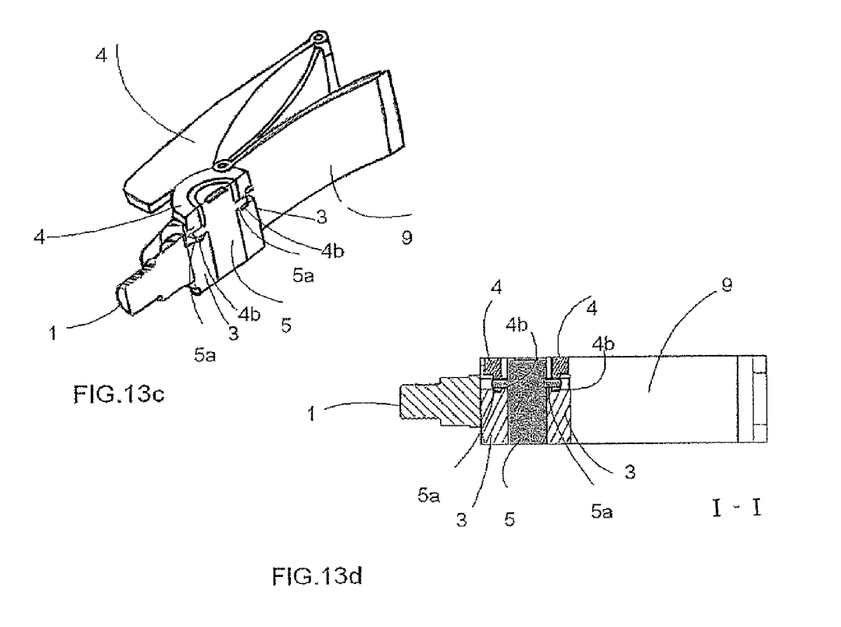

FIG. 13b, in addition to the dynamic main component 4, also shows the locking mechanism 5, which includes two latches 5a which have two main modes, one is a folded mode which enables unlocking and in the other they are protrude outwards and stick into the holes 4b in the lock shackles 4a. Selection of one of these modes and switching from one mode to the other is performed as in conventional locks, namely by means of a key or any other suitable mechanism. This illustration shows section I-I. The isometric illustration in FIG. 13c and the illustration of section I-I in FIG. 13d, show the locked mode of latches 5a in the holes 4b in the lock shackles 4a.

Figure 14A:
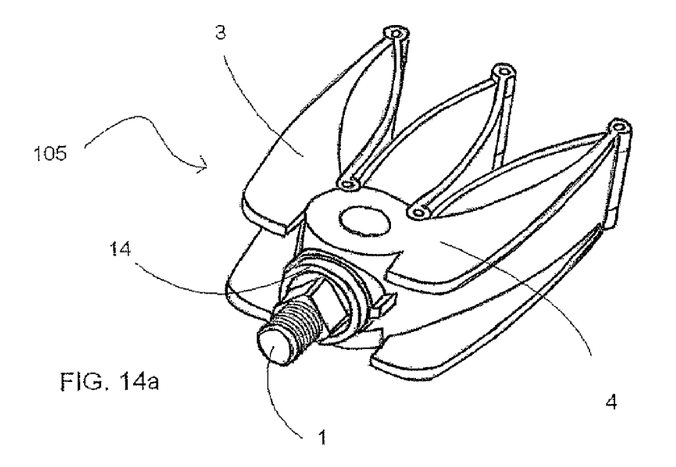
FIGS. 14a-14c are schematic illustrations of a bearing and its disposition in a preferred embodiment of a combined bicycle pedal and lock
Figure 14B:
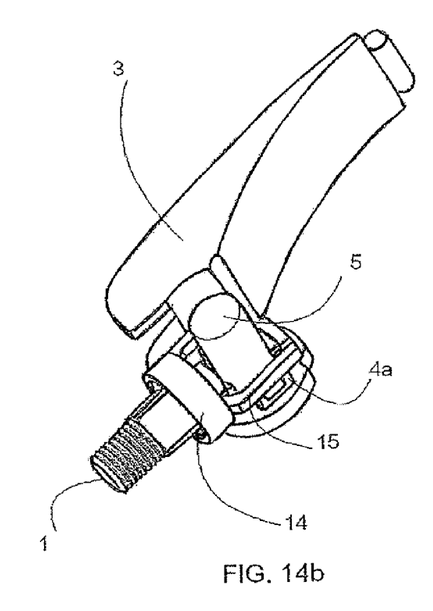
Figure 14C:
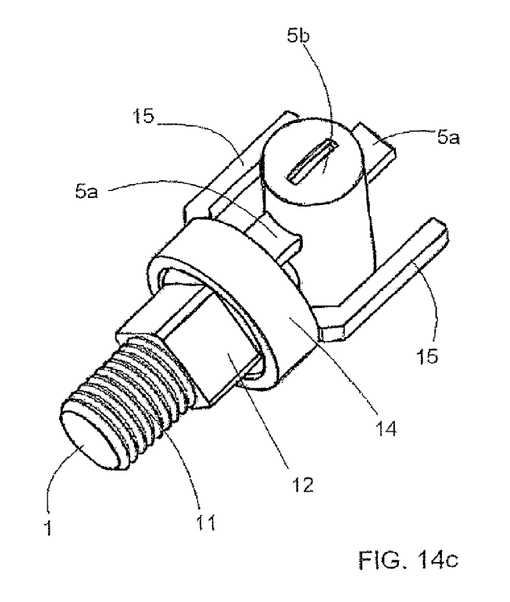

FIGS. 14a-14c are schematic illustrations of a bearing and its disposition in a preferred embodiment of a combined bicycle pedal and lock 105, according to the present invention. FIG. 14a shows the external housing 14 of a bearing that enables good rotational movement of all of the components and assemblies that need to rotate around axle 1 in order to enable combined bicycle pedal and lock 105 to function as a bicycle pedal.

The bearing external housing 14 is connected by a rigid connection to the dynamic main component 4.

FIGS. 14b and 14c shows that the bearing external housing 14 is connected by a rigid connection to two strengthening arms 15 designated to carry some of the bending load applied to the combined bicycle pedal and lock 105 when serving as a pedal.

FIG. 14c shows the details of the locking mechanism 5, which also include latches 5a which can, when locked, protrude from the locking mechanism shaft 5b.

Figures 15A, 15B:
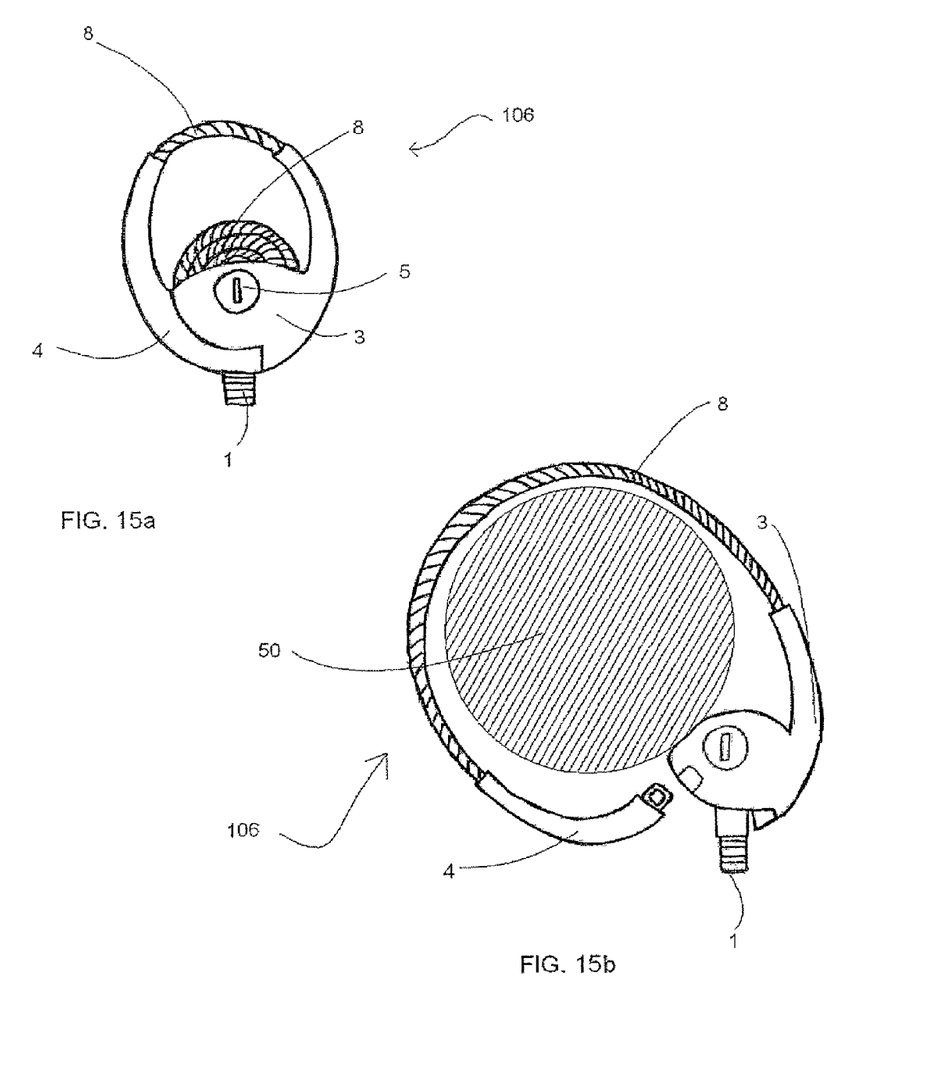
FIGS. 15a and 15b are schematic illustrations a preferred embodiment of a combined bicycle pedal and lock, also including two main part and a cable serving as a complementary locking assembly, in two different modes, according to the present invention.

FIGS. 15a-15b are schematic illustrations of a preferred embodiment of a combined bicycle pedal and lock 106, according to the present invention, which also includes two main parts and a cable 8, serving as a complementary locking assembly, in various modes.

FIG. 15a shows a closed mode, suitable for use as a bicycle pedal when riding. Part of cable 8 is wound around the locking mechanism 5. Cable 8, when there is no countering force, winds this way by means of a spring, which is not shown in the illustration. Cable 8 goes through a passage in the static main component 3, and is connected at one end to the dynamic main component 4.

FIG. 15b shows a mode in which cable 8 is pulled out of the static main component 3, prior to locking around a pole 50.

Figure 16A:
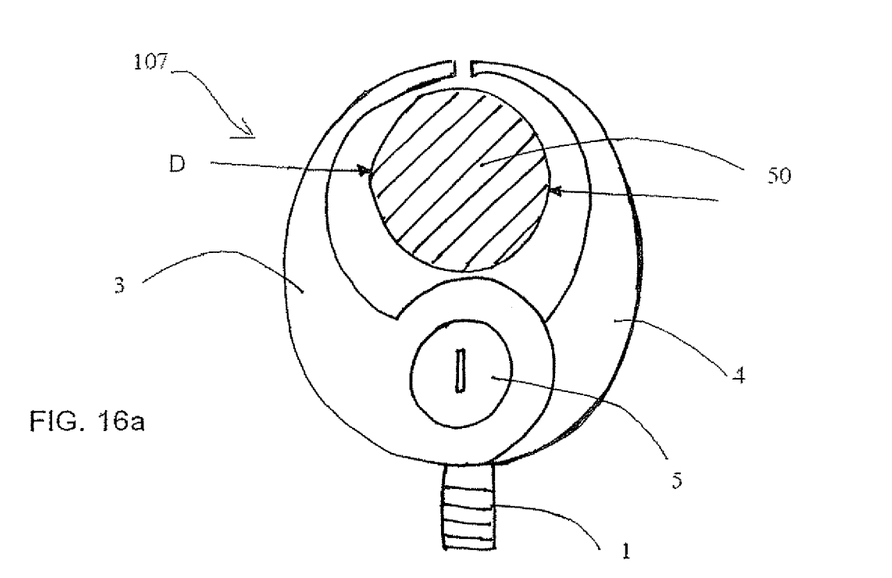
FIGS. 16a-16b are schematic illustrations of another preferred embodiment of a combined bicycle pedal and lock also including two main parts, according to the present invention.
Figure 16B:
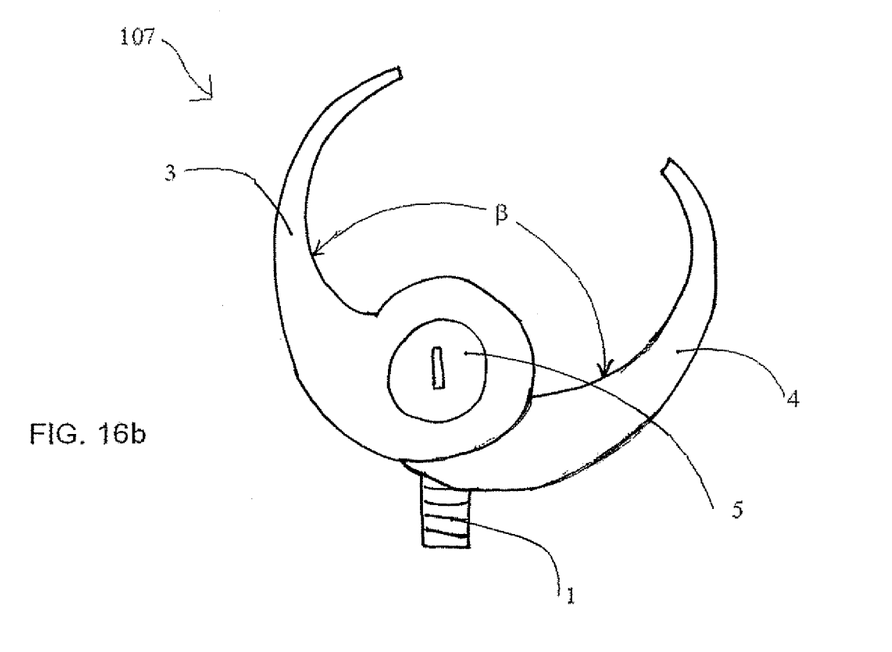

FIGS. 16a-16b are schematic illustrations of another preferred embodiment of a combined bicycle pedal and lock 107, also including, according to the present invention, a static main component 3, and a dynamic main component 4, both attached to a pedal shaft 1 and to a locking mechanism 5 having a symmetrical axis.

The dynamic main components 4 can have sufficient rotational movement around the symmetry axis of the locking mechanism 5, so that it can be opened at least to angle β which is sufficient for passing a pole of circumference D through the opening created at the ends of the static main component 3 and the dynamic main component 4, to which the combined bicycle pedal and lock 107 can be locked.

According to another embodiment of the present invention, in lieu of the static main component 3, combined bicycle pedal and lock 107 includes another dynamic main component 4, namely includes two dynamic main components 4.

As used herein the specification and in the claims section that follows, the term "combined bicycle pedal and lock" and the like refer to an assembly serving as a substantially integral part of a bicycle, and filling two functions, in one of which the assembly serves as an ordinary bicycle pedal, and in the other the assembly serves as a means of locking the bicycle to an object which is not a part of the bicycle.

Although the invention has been described in conjunction with specific embodiments thereof, it is evident that many alternatives, modifications and variations will be apparent to those skilled in the art.

These descriptions in no way limit the locking of a bicycle to an object by means of the combined bicycle pedal and lock, according to the present invention, locking is possible in many ways such as encircling an object with the complementary locking assembly and locking it, passing it over an object when it is open but locked, if there are two dynamic main components by separating both dynamic main components from the complementary locking assembly and reconnecting and locking them to encircle the object, or using the complementary locking assembly when it is locked, either folded or open, and passing as suitable locking means through it.

Accordingly, it is intended to embrace all such alternatives, modifications and variations that fall within the spirit and broad scope, including use of integral parts of bicycles and motorcycles other than the pedal for locking.

What is claimed is:

1. A combined bicycle pedal and lock assembly for enabling the rider of a bicycle to use the assembly as a pedal while riding the bicycle, and as a locking means for locking the bicycle to a stationary object at other times, wherein the combined bicycle pedal and lock assembly is an integral part of the bicycle, the combined bicycle pedal and lock comprising:
   (a) a pedal shaft; and
   (b) a locking mechanism disposed on said pedal shaft; said locking mechanism including a static main component pivotally connected to series of at least two pivotally connected links, last of said series of pivotally connected links being a dynamic main component having a non-pivotally connected end configured to be releasably locked to said locking mechanism, said series of pivotally connected links being configured to be deployable in a pedal configuration or in a bicycle lock position for locking the bicycle to a stationary object.

2. The combined bicycle pedal and lock assembly of claim 1 wherein said locking mechanism includes:
   (i) locking mechanism shaft;
   (ii) at least one latch disposed on said locking mechanism shaft, wherein said latch can protrude from some locking mechanism shaft; and
   (iii) at least two shackles disposed on said dynamic main component.

3. The combined bicycle pedal and lock assembly of claim 2 further comprising:
   (c) at least one strengthening element disposed on said pedal shaft; and
   (d) a bearing, wherein said bearing enables said pedal assembly operatively low-friction free rotational motion around said pedal shaft.

4. The combined bicycle pedal and lock assembly of claim 1 having a maximum deflection of 0.1 millimeter when a bicycle rider applies a force of 600 Newton on said combined bicycle pedal and lock assembly.

5. The combined bicycle pedal and lock assembly of claim 1 wherein said series of at least two pivotally connected links having a maximum collective length of 130 millimeters.

6. A combined bicycle pedal and lock assembly for enabling the rider of a bicycle to use the assembly as a pedal while riding the bicycle, and as a locking means for locking the bicycle to a stationary object at other times, wherein the combined bicycle pedal and lock assembly is an integral part of the bicycle, the combined bicycle pedal and lock comprising:
   (a) a pedal shaft,
   (b) a locking mechanism disposed on said pedal shaft, said locking mechanism including a static main component having a first end and a second end, the first end of said static main component being connected to said locking mechanism and the second end of said static component being pivotally connected to a dynamic main component, dynamic main component having a non-connected end configured to be releasably locked to said locking mechanism, said static and dynamic main components being configured to be deployable in a pedal configuration or in a bicycle lock configuration for locking the bicycle to a stationary object.

7. A method of locking a bicycle, comprising the steps of:
   (a) providing a bicycle having a combined bicycle pedal and lock assembly including:
      i. a pedal shaft, and
      ii. a locking mechanism disposed on said pedal shaft said locking mechanism including a static main component having a first end and a second end, the first end of said static main component being connected to said locking mechanism and the second end of said static component being pivotally connected to a dynamic main component, dynamic main component having a non-connected end configured to be releasably locked to said locking mechanism, said static and dynamic main components being configured to be deployable in a pedal configuration or in a bicycle lock configuration for locking the bicycle to a stationary object, wherein said static and dynamic main components being deployed in a pedal configuration;

(b) unlocking said locking mechanism;

(c) wrapping said dynamic component around a stationary object; and (d) locking the said non-connected end of said dynamic main component into said locking mechanism.

* * * * *